(12) United States Patent
Kodaira

(10) Patent No.: US 6,427,799 B1
(45) Date of Patent: Aug. 6, 2002

(54) ELECTRIC POWER STEERING DEVICE

(75) Inventor: Tadao Kodaira, Maebashi (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 09/582,447

(22) PCT Filed: Oct. 27, 1999

(86) PCT No.: PCT/JP99/05939

§ 371 (c)(1),
(2), (4) Date: Jun. 23, 2000

(87) PCT Pub. No.: WO00/26077

PCT Pub. Date: May 11, 2000

(30) Foreign Application Priority Data

Oct. 29, 1998 (JP) .......................... 10-308395

(51) Int. Cl.[7] ................................ B62D 5/04
(52) U.S. Cl. ..................................... 180/444
(58) Field of Search ................. 180/400, 440, 180/444, 443, 446

(56) References Cited

U.S. PATENT DOCUMENTS

| 4,577,715 | A | * | 3/1986 | Saito .......................... 180/79.1 |
| 4,653,602 | A | * | 3/1987 | Anders et al. ............... 180/79.1 |
| 4,809,806 | A | * | 3/1989 | Pietrzak et al. ............. 180/148 |
| 5,265,691 | A | * | 11/1993 | Konishi et al. .............. 180/148 |
| 5,590,732 | A | | 1/1997 | Sugino et al. ............... 180/444 |
| 6,123,167 | A | * | 9/2000 | Miller et al. ................. 180/444 |

FOREIGN PATENT DOCUMENTS

| JP | 09-071248 | 3/1997 |
| JP | 09-142314 | 6/1997 |

* cited by examiner

*Primary Examiner*—Lanna Mai
*Assistant Examiner*—Paul Royal, Jr.
(74) *Attorney, Agent, or Firm*—McCormick, Paulding & Huber LLP

(57) ABSTRACT

An electric power steering unit comprises a housing (A) for containing a rack-shaft and holding therein a coupling section of the rack-shaft to a pinion of a steering column and an electric motor equipped with a yoke (7) arranged inside the housing (A) and integrally formed therewith, and a ball screw mechanism (3) contained in a housing (B) for transmitting the rotating force of the motor to the rack-shaft as the steering assisting power. A female threaded portion (36) is formed at the end portion of yoke (7) on the housing (B) side. The female threaded portion (36) is fitted to a male threaded portion (37) formed on the end portion of housing (A) on the housing (B) side to couple the housing (A) to the housing (B). As a result, wear and adhesion are prevented as well as wall thickness is reduced with the coupling strength of the housings maintained in the electric power steering unit with a configuration in which the housings are coupled with screws.

7 Claims, 5 Drawing Sheets

ELECTRIC POWER STEERING DEVICE

TECHNICAL FIELD

This invention relates to an electric power steering unit to be used for a vehicle and, more particularly, it relates to a field of technology effectively applicable to electric power steering gears to be used for rack and pinion type steering systems.

BACKGROUND ART

For assisting steering power of vehicles, a so-called power steering unit is equipped to many vehicles in recent years, and various power steering units such as hydraulic type, electric type, etc. are proposed. Of these power steering units, for the electric type power steering unit applied to rack and pinion type steering units (so-called electric power steering), the one called rack-assist type that obtains steering assisting power by a motor equipped close to the rack shaft is known.

FIG. 5 is an explanatory view showing one example of this kind of rack-assist type power steering unit. As shown in FIG. 5, the electric power steering unit has a motor 52 installed coaxially with a rack shaft 51, and the steering assisting power generated by the motor 52 is transmitted to the rack shaft 51 via a ball screw mechanism 53. And with this steering assisting power and manual steering power, guiding wheels are turned to alleviate steering loads of a driver.

The rack-shaft 51 is linked to the guiding wheels typically by way of tie rods or knuckle arms arranged at the respective opposite ends thereof and also linked to the steering column 54 that is coupled to the steering wheel by way of a rack and pinion gear so that it may be reciprocatively moved in the horizontal directions of FIG. 5 as the steering operation by the driver. The motor 52 is arranged in a housing 71 containing coupling section 68 between the steering column 54 and the rack shaft 51, and a cylindrical armature shaft 56 and a field device 57 coaxially inserted in a cylindrical yoke 55. In the power steering unit of FIG. 5, the yoke 55 is formed integral in the housing 71. In addition, the field device 57 comprises a magnet 59 installed to the inner circumferential portion of the yoke 55 and an armature core 60 installed to the outer circumferential portion of the armature shaft 56. And electric power is supplied to this motor 52 via a power supply section 58 equipped with a brush 61 and a commutator 76 in slidably contact therewith.

On the other hand, the ball screw mechanism 53 is of a generally known construction in which a large number of balls 64 are intermediately inserted between a nut section 62 and a screw section 63. In this case, the nut section 62 is held rotatably in the housing 72 by an angular bearing 65 in the condition housed in a holder 75. The rotating force of the motor 52 is transmitted from the armature shaft 56 to the rack shaft 51 via the nut section 62, balls 64, and screw section 63 in the form of axial reciprocating motion, and assists the steering power.

Now, in the power steering unit of FIG. 5 comprising in this way, both housings 71 and 72 are assembled by directly coupling the housings with screws. In a conventional power steering unit, right and left housings have a flange protrudably formed at each end portion, respectively, and by connecting these with bolts, the housings are coupled. However, since the power steering unit is generally installed near the road surface of the car body and must be housed in a limited space below the engine room, it is not desirable to have protrusions on the outer circumference of the device and the improvements have been waited.

Therefore, in the power steering unit of FIG. 5, a system for coupling the housings with screws as shown in FIG. 6 is adopted, and here, the device configuration free of protrusions with the flange removed has been achieved. FIG. 6 is an enlarged sectional view of a main portion showing the configuration of the coupling portion. In the figure, a female threaded portion 73 is formed on the left inner circumference of the housing 71, while a male threaded portion 74 is formed on the right end outer circumference of the housing 72. And by driving a male threaded portion 74 into this female threaded portion 73, both housings 71 and 72 are coupled together.

However, in the power steering unit of FIG. 5, since both housings 71 and 72 are formed with same material by aluminum die casting, etc., there is a problem in that the contact surface wears and is easy to adhere by surface pressure and friction caused by tightening. Consequently, lubrication and surface treatment are required between both housings, also resulting in a problem of disadvantages from the viewpoint of man-hour or parts cost.

In addition, because both housings 71 and 72 are formed with nonferrous metals such as aluminum, etc. for weight reduction, there was a problem of decreased coupling strength or rigidity at the threaded portion. Consequently, as shown in FIG. 6, the wall thickness at the threaded portion must be increased to secure the strength of the coupling portion, also producing a problem of going against needs of reduced weight, reduced thickness, and reduced size.

It is an object of the present invention to prevent wear and adhesion and to reduce the wall thickness with the coupling strength of housings secured in an electric power steering unit of a configuration in which housings are coupled with screws.

The above-described and other objects and novel feature of the present invention will become apparent more fully from the description of the following specification in conjunction with the accompanying drawings.

DISCLOSURE OF INVENTION

The electric power steering unit according to the present invention comprise a rack- shaft to be coupled to the guiding wheels of a vehicle, a first housing for movably containing the rack-shaft and holding therein a coupling section for causing the teeth of the rack-shaft to engage those of a pinion arranged on the steering column linked to the steering handle of the vehicle, an electric motor equipped with a yoke integrally formed with the first housing and coaxially arranged around the rack-shaft to supply assisting power to the rack-shaft, a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, and a second housing for containing the ball screw mechanism, characterized in that a first threaded portion is formed at the end portion of the yoke on the second housing side, a second threaded portion is formed to fit to the first threaded portion on the end portion of the second housing on the first housing side; and the first housing and the second housing are coupled together by fitting the first threaded portion to the second threaded portion.

With this configuration, the first threaded portion and the second threaded portion fitted to it are able to be formed with different materials, and it becomes possible to prevent wear or adhesion on the contact surface caused by fitting screws of the same material.

On the other hand, the first threaded portion may be formed into female screw and the second threaded portion into male screw, and in such case, it is possible to form the female screw on the steel-made yoke, increasing the coupling strength and rigidity at the threaded portion, and this no longer requires to form the coupling portion to have large wall thickness, and the housing is able to reduce wall thickness.

In addition, the first threaded portion may be made into a male screw and the second threaded portion into a female screw. Preferably, the first threaded portion may be made of steel, and the second threaded portion may be made of aluminum.

Furthermore, caulking grooves may be formed on the outer circumference of the second housing, and the end portion of the first housing on the second housing is caulked to these caulking groove, thereby forming caulking portions to fix the first and the second housings. Preferably, the caulking grooves may be formed continuously throughout the whole circumference of the second housing or a plurality of caulking grooves may be intermittently formed on the outer circumference of the second housing.

BEST MODE FOR CARRYING OUT THE INVENTION

Figure 1:
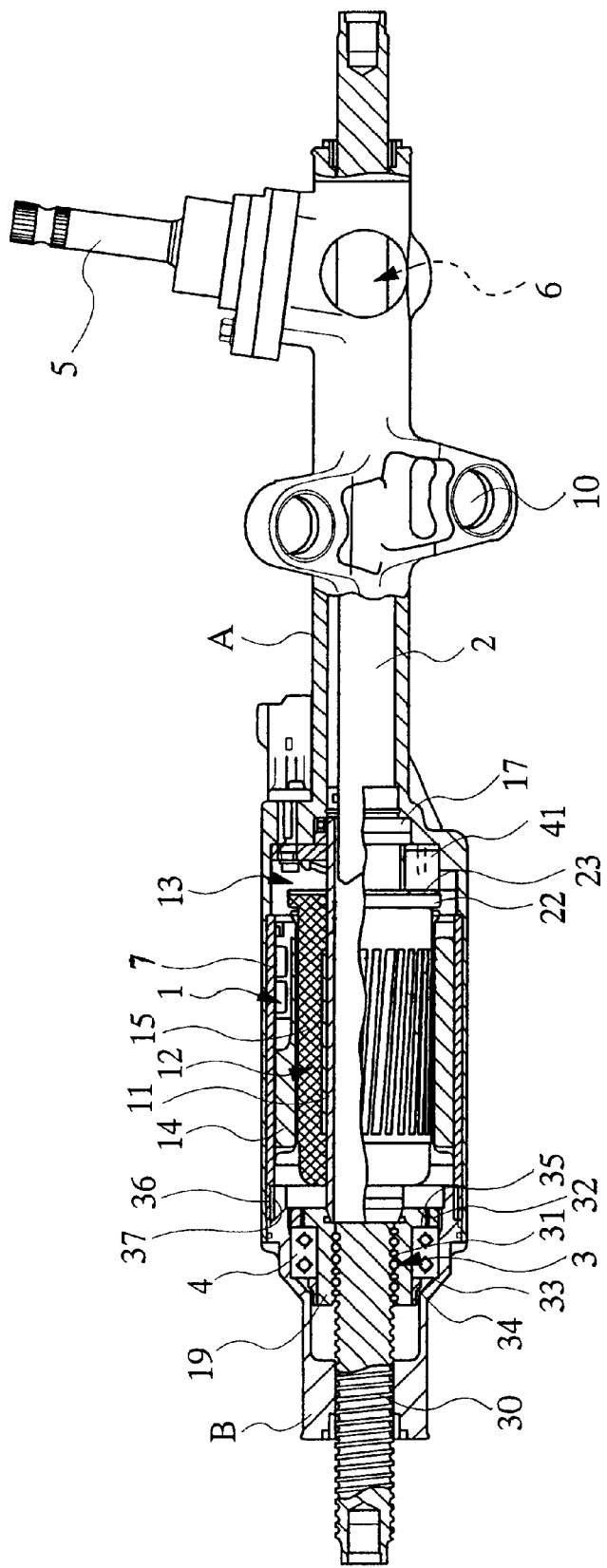
FIG. 1 is an explanatory view, partly in portion, of the overall configuration of an electric power steering unit, which is one embodiment of the present invention.

Now, the invention will be described in greater detail by referring to the accompanying drawings that illustrate preferred embodiments of the invention. FIG. 1 is an explanatory view, partly in portion, of the overall configuration of an electric power steering unit which is one embodiment of the present invention and FIG. 2 is a sectional view showing the configuration of a main portion thereof.

Figure 5:
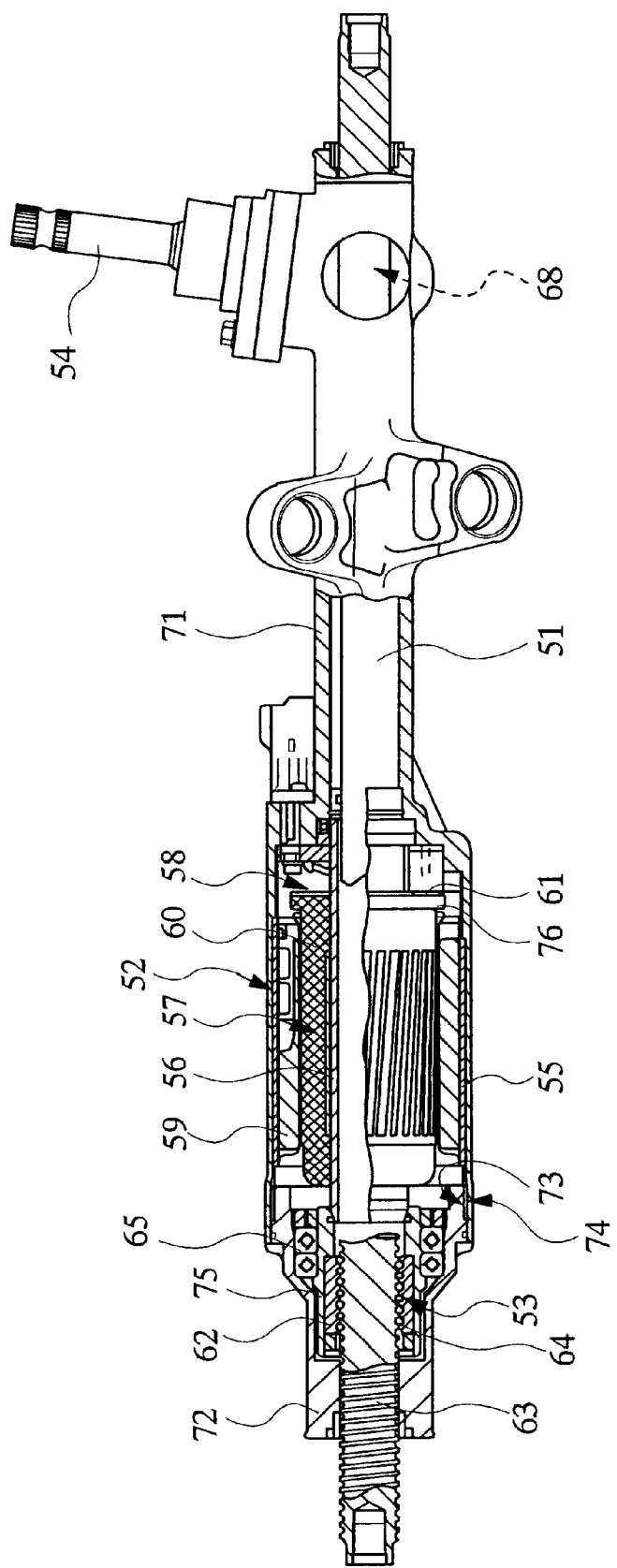
FIG. 5 is an explanatory view, partly in portion, of the overall configuration of a conventional electric power steering unit.
Figure 6:
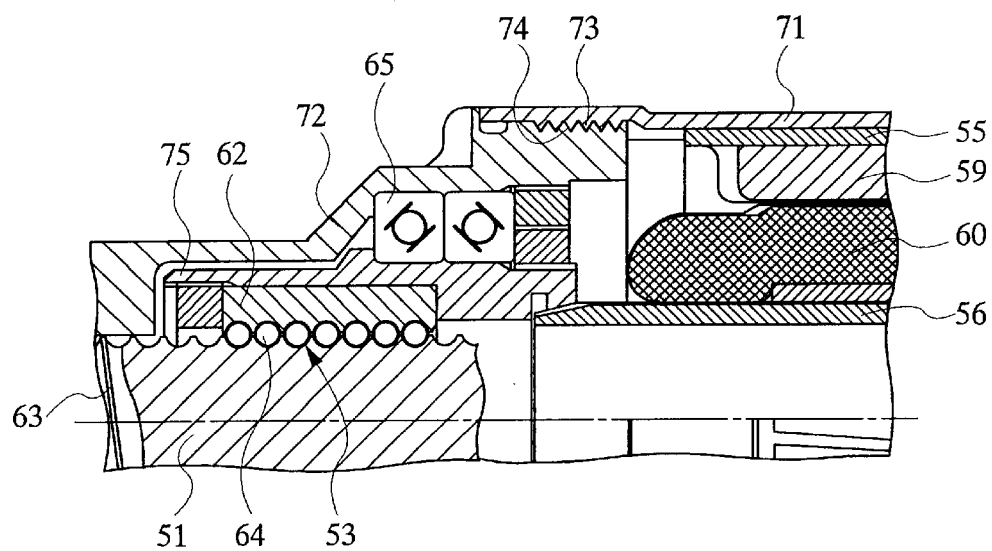
FIG. 6 is an enlarged sectional view showing the configuration of a main portion of the electric power steering unit of FIG. 5.

As seen from FIG. 1, the electric power steering unit (hereinafter referred to as "power steering unit") of the present invention is provided with an electric motor 1 having a hollow central area and arranged around a rack-shaft 2 as in the case of the conventional power steering units shown in FIGS. 5 and 6 and, for example, the unit is fitted to the steering gear of the wheels of a vehicle that are typically the front wheels. The steering assisting power generated by the motor 1 is transmitted to the rack-shaft 2 via a ball screw mechanism 3 to reduce the physical load for steering the vehicle on the part of the driver.

Figure 2:
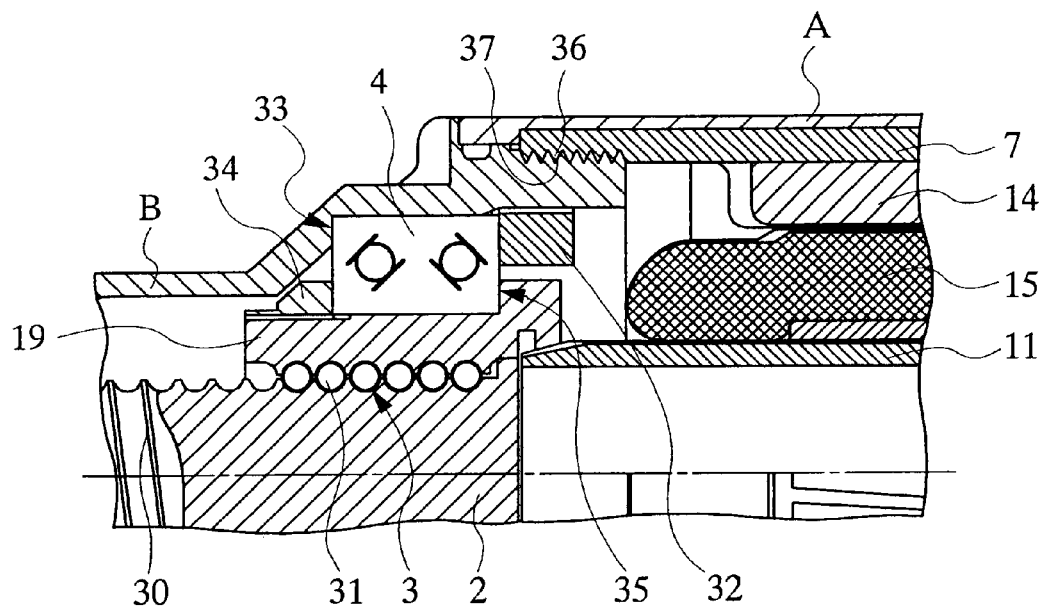
FIG. 2 is a sectional view showing the configuration of a main portion of the electric power steering unit of FIG. 1.

The power steering unit further comprises a housing A (first housing) formed integral with a yoke 7 of the motor 1 and a housing B (second housing), which are connected by screws as shown in FIGS. 1 and 2, and the rack-shaft 2 is arranged in them in such a way that it may be moved to the right and the left direction in FIG. 1. Then, the power steering unit 1 is fitted to the vehicle main body by means of a bracket (not shown) and fitting holes 10 of the housing A and, at the same time, the wheels are linked to the respective ends of the rack-shaft 2 by means of tie rods or knuckle arms.

On the other hand, the housing A is a hollow member typically made of aluminum die-casting, to which a cylindrical motor yoke (hereinafter referred to as yoke) 7 is integrally cast. On the right side end of housing A in FIG. 1, a coupling section 6 is arranged for coupling the rack-shaft 2 with the steering column 5 of the vehicle that is further linked to the steering wheel. In this coupling section 6, a pinion (not shown) arranged on the steering column 5 and the teeth (not shown) of a rack arranged on the outer side portion of the rack-shaft 2 are engaged with each other so that the rotary motion of the steering column 5 is converted into a reciprocative motion of the rack-shaft 2 that moves right and left direction in FIG. 1. Note, a torque sensor (not shown) is arranged on the coupling section 6 to detect the torque of the steering column 5 so that the power output of the motor 1 may be controlled as a function of the detected torque.

The electric motor 1 has a cylindrical yoke 7 containing coaxially therein a cylindrical armature shaft 11 and a field device 12. The rack-shaft 2 is assembled to runs through the inside of the armature shaft 11. The field device 12 comprises a plurality of magnets 14 arranged on the inner peripheral surface of the yoke 7 and an armature core 15 arranged on the outer peripheral portion of the armature shaft 11 and is fed with electric power from a power supply section 13. The yoke 7 is a hollow and cylindrical member made of iron and having a profile of a cylindrical pipe with a substantially constant thickness, and as described above, it is cast into the housing A. A notch (may be hole, protrusion, etc.) (not shown) is provided to the yoke 7, and with this, the yoke is cast into the housing A in the locked state.

The magnets 14 of the field device 12 operates as field poles and are arranged peripherally at regular intervals in the yoke 7. The armature shaft 11 is held at an end thereof (the right side end in FIG. 1) by a bearing 17 fitted to the housing A and provided on the other end (the left side end in FIG. 1) with a tapered spline, which is engaged with a corresponding spline formed at an end of a nut section 19 of the ball-and-screw mechanism 3 so that the rotary motion of the armature shaft 11 is transmitted to the nut section 19.

The power supply section 13 is designed to feed the armature with electricity and comprises a commutator 22 rigidly secured to the armature shaft 11 and a brush 23 held in contact with the peripheral surface of the commutator 22 to provide electric contact points between them. In this unit, a so-called disk type commutator is used for the commutator 22, and the brush 23 comes slidably in contact with the right end face from the axial direction. The brush 23 is held inside a brush holder 41 made of synthetic resin, and pressed against the commutator 22 under a predetermined pressure by means of an elastic member (not shown).

The housing B is, like the housing A, a hollow member typically made of aluminum die-casting and provided in the inside with a ball-and-screw mechanism 3. The ball-and-screw mechanism 3 per se is known and comprises a nut section 19, a screw section 30 formed on the outer peripheral wall of the rack-shaft 2 and a number of balls 31 arranged between the nut section 19 and the screw section 30. The rack-shaft 2 is supported by the nut section 19 in such a way that its rotary motion around the axis of rotation is restricted but it is reciprocated right and left direction in FIG. 1 as the nut section 19 is rotated.

The nut section 19 is axially rotatably held relative to the housing B with an angular bearing 4 interposed therebetween and securely fitted to the housing B. Thus, the nut section 19 of the ball-and-screw mechanism 3 and the angular bearing 4 are combined to form a unitary member and arranged in the housing B that is separated from the housing A in this unit. The angular bearing 4 is securely held between a bearing holder ring 32 screwed into an opening of the housing B and a stepped section 33 formed in the housing B to restrict its axial movement. The relative axial movement of the nut section 19 and the angular bearing 4 is restricted by another bearing holder ring 34 screwed into the left end of the nut section 19 and another stepped section 35 formed on the outer peripheral wall of the nut section 19.

On the other hand, the housing A and the housing B is coupled by fitting the threaded portions formed, respectively. In the power steering unit according to the present invention, the yoke 7 integrally cast with the housing A is provided in such a form that it is extended to the housing B side in the axial direction as compared to that of FIG. 5, and a female threaded portion (first threaded portion) 36 is formed on the inner surface of the left end portion. As against this, on the housing B side, a male threaded portion (second threaded portion) 37 fitted to the female threaded portion 36 is formed on the periphery at the right end portion, and by screwing this male threaded portion 37 into the female threaded portion 36, both housings A and B are coupled together. By the way, in this unit, the female threaded portion 36 is formed beforehand in the yoke 7 prior to forming the housing A, and the yoke 7 with the female threaded portion 36 formed is integrally cast inside the housing A in such a manner that the yoke 7 is unable to move in the circumferential direction.

As described above, in this unit, the female threaded portion 36 is formed into the steel-made yoke 7 integrally formed inside the housing A. Consequently, the yoke forms a combination of different materials from the male threaded portion 37 made of aluminum, which is the counterpart to be coupled, and therefore, it is able to prevent wear and adhering on the contact surface caused by a conventional combination of same materials. This eliminates a need for lubricating or surface-treating the threaded portion, and results in advantage from the viewpoint of cost. In addition, since the female threaded portion 36 is made of steel, the coupling strength and rigidity of the threaded portion increase, and this also eliminates a need to form the coupling portion with increased wall thickness, and makes it possible to reduce wall thickness of the housing A.

Figure 3:
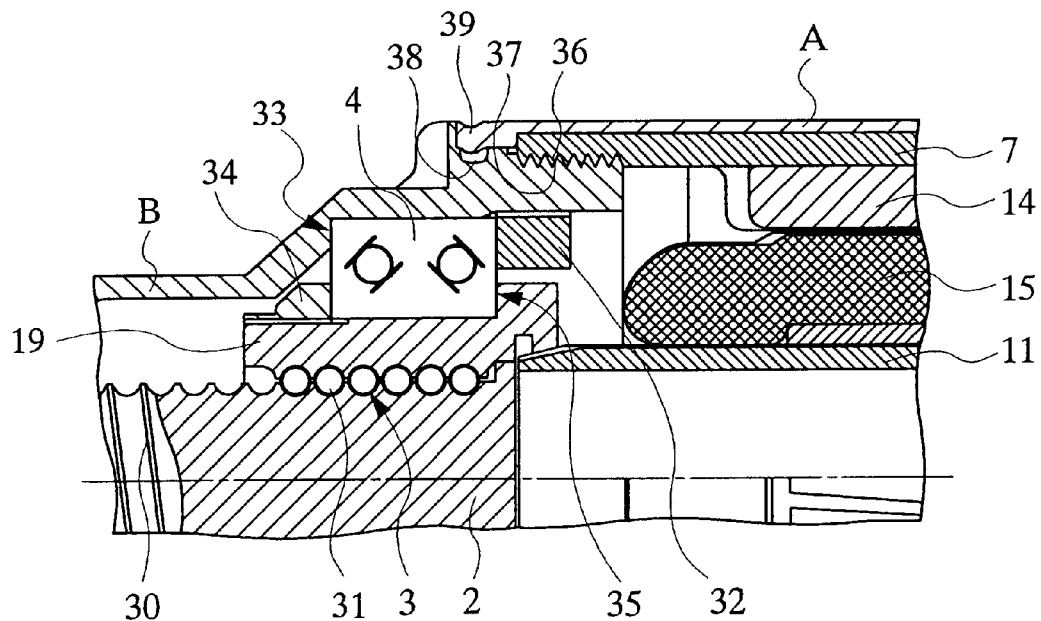
FIG. 3 is a sectional view showing the configuration of a main portion of a modification of the electric power steering unit of FIG. 1.

Note, after the male threaded portion 37 is screwed into the female threaded portion 36, the periphery of the housing A may be caulked at several places for locking to tightly fix the housing A to housing B. FIG. 3 is a sectional view of the main portion showing one modification in which such caulking was carried out. In this case, by caulking the left end portion of housing A, a caulking portion 39 is formed on the caulking groove 38 formed continuously or intermittently in plural on the periphery of the housing B, and both housings A and B are fixed.

On the other hand, the power steering unit operates in a manner as described below. Firstly, as the steering wheel is operated by the driver to turn the steering column 5 and the rack-shaft 2 is moved in the direction corresponding to the sense of rotation of the steering column 5 to carry out a necessary steering operation. When by this operation, a steering torque sensor (not shown) is actuated, electric power is fed to the commutator 22 via the brush 23 in accordance with this detected torque. As the motor 1 is driven to operate the armature shaft 11 and hence the nut section 19 coupled to it are rotated. As the nut section 19 rotates, the steering assisting power is transmitted to the rack-shaft 2 under the effect of the ball-and-screw mechanism 3, whereby the movement of the rack-shaft 2 is promoted and the steering power is assisted.

Detailed description has hereinabove been given of the invention achieved by the present inventor with reference to the embodiment. However, the present invention should not be limited to the embodiment described above, and may be variously modified within the scope not departing from the gist.

Figure 4:
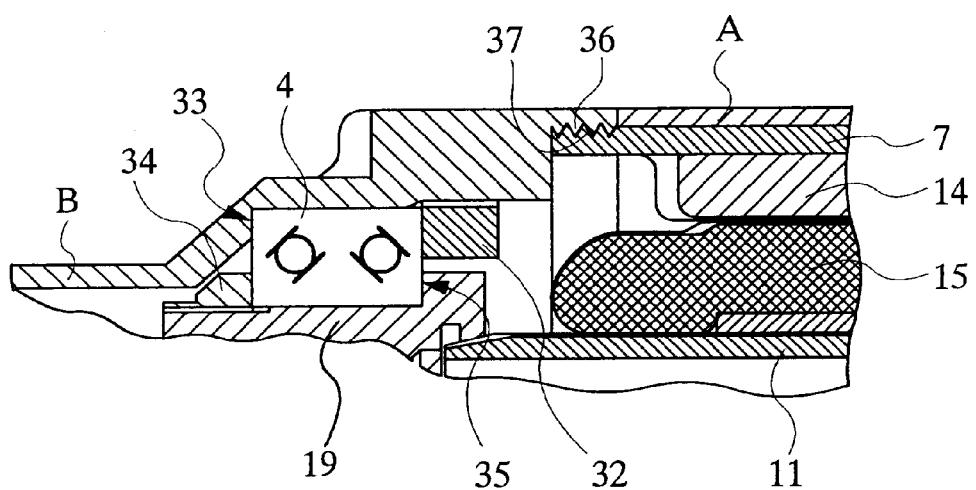
FIG. 4 is an explanatory view showing a configuration of a modification of a housing coupling portion.

For example, in the present invention, a housing coupling portion was of a configuration to couple the female screw section 36 formed in the yoke 7 to the male threaded portion 37 formed in the housing B, but conversely, for example, as in the case of FIG. 4, the male threaded portion (first threaded portion) 42 may be formed in the yoke 7, and the female threaded portion (second threaded portion) 43 may be formed in housing B. And in this case also, the male screw section 42 and the female screw section 43 may be formed with different materials. In addition, the configuration of the present invention may be applied to the regular general motor, in which a threaded portion is formed in the yoke making the best of the yoke made of steel.

Furthermore, a brushless electric motor may be used for an electric power steering unit according to the invention. If such is the case, the field device has a core and magnets respectively arranged on the yoke side and the armature shaft side while the power supply section has a circuit board comprising conducting means and a detector for detecting the angular position of the armature shaft. Additionally, the present invention is applicable not only to front wheels steering unit but also to rear wheels steering unit having the same constitution and mounting condition as the front wheels steering unit.

As described above, according to the present invention, forming the first threaded portion on the end portion of the yoke, and fitting it to the second threaded portion formed on the end portion of the housing A to couple both housings A and B make it possible to form the first and the second threaded portions with different materials, and enable prevention of wear and adhesion of the contact surface caused by fitting screws of same material.

In addition, forming a female screw for the first threaded portion forms the female threaded portion on the yoke made of steel, which is able to increase the coupling strength and rigidity of the coupling portion of the screw. Consequently, it is no longer necessary to form the coupling portion in increased wall thickness, and it becomes possible to reduce wall thickness of the housing, and thereby the whole equipment can be made lightweight, thinner, and compact.

What is claimed is:

1. An electric power steering unit for use with a vehicle having guiding wheels, a steering handle, a steering column linked to the steering handle, and a toothed pinion arranged on the steering column, said steering unit comprising:

a toothed rack-shaft to be coupled to the guiding wheels of the vehicle, a first housing for movably containing the rack-shaft and holding therein a coupling section for causing teeth of the rack-shaft to engage those of the pinion arranged on the steering column, an electric motor equipped with a yoke integrally formed with the first housing and coaxially arranged around the rack-shaft to supply assisting power to the rack-shaft, a ball screw mechanism connecting a nut section linked to an armature shaft of the electric motor with a screw section formed on the rack-shaft by disposing ball members therebetween and for transmitting the rotary power of the electric motor to the rack-shaft as assisting power for steering, and a second housing containing the ball screw mechanism, said armature shaft carrying an armature core having first and second ends with the first end being closer to the coupling section than the second end, the first housing and the yoke both extending fully along the armature core between the first and second ends of the armature core, a first threaded portion being formed on an end portion of the yoke defining the farthest extent of the yoke away from the coupling section, a second threaded portion being formed to fit to the first threaded portion on an end portion of the second housing defining the closest approach of the second housing toward the coupling section, and the first housing and the second housing being coupled together by fitting the first threaded portion to the second threaded portion.

2. An electric power steering unit according to claim 1, wherein the first threaded portion is formed into a female screw and the second threaded portion is formed into a male screw.

3. An electric power steering unit according to claim 1, wherein the first threaded portion is formed into a male screw and the second threaded portion is formed into a female screw.

4. An electric power steering unit according to claim 1, wherein the first threaded portion is made of steel, and the second threaded portion is made of aluminum.

5. An electric power steering unit according to claim 1, wherein caulking grooves are formed on an outer circumference of the second housing, and the end portion of the first housing is caulked to these caulking grooves to fix the first and the second housings.

6. An electric power steering unit according to claim 5, the caulking grooves are formed continuously throughout the whole circumference of the second housing.

7. An electric power steering unit according to claim 5, wherein the caulking grooves are intermittently formed in plural on the outer circumference of the second housing.

* * * * *